United States Patent [19]
Barsoum et al.

[11] Patent Number: 5,942,455
[45] Date of Patent: Aug. 24, 1999

[54] SYNTHESIS OF 312 PHASES AND COMPOSITES THEREOF

[75] Inventors: Michael Barsoum, Pennsauken, N.J.; Tamer El-Raghy, Philadelphia, Pa.; Dmitri Brodkin, Drexel Hill, Pa.; Antonios Zavaliangos, Bryn Mawr, Pa.; Surya Kalidindi, Turnersville, N.J.

[73] Assignee: Drexel University, Philadelphia, Pa.

[21] Appl. No.: 08/726,473

[22] Filed: Mar. 6, 1996

Related U.S. Application Data

[60] Provisional application No. 60/006,720, Nov. 14, 1995.

[51] Int. Cl.⁶ .................................................. C01B 33/00
[52] U.S. Cl. ........................... 501/91; 501/97.1; 423/324
[58] Field of Search .................................. 423/324, 276; 501/91, 96, 98, 97.1

[56] References Cited

U.S. PATENT DOCUMENTS

| | | | |
|---|---|---|---|
| 3,726,643 | 4/1973 | Merzhanon et al. | 423/297 |
| 4,670,458 | 6/1987 | Petzow et al. | 423/297 |

OTHER PUBLICATIONS

Jeitschko et al., "Die Kristallstruktur von $Ti_3SiC_2$–ein neuer Komplexcarbid–Typ", *Montash Für Chem.* 98:329–337 (1967).

Morozumi et al., "Bonding Mechanism Between Silicon Carbide and Thin Foils of Reactive Metals", *J. Materials Science* 20:3976–3982 (1985).

Goto et al., "Chemically Vapor Deposited $Ti_3SiC_2$", *Mat. Res. Bull.* 22:1195–1201 (1987).

Pampuch et al., "Solid Combustion Synthesis of $Ti_3SiC_2$", *J. European Ceramic Soc.* 5:283–287 (1989).

Pampuch et al., "$Ti_3SiC_2$–Based Materials Produced by Self–Propagating high–Temperature Synthesis (SHS) and Ceramic Processing", *J. Materials Synthesis and Processing* 1(2):93–100 (1993).

Okano et al., "Synthesis and Mechanical Properties of $Ti_3SiC_2$ Ceramic" *Advanced Materials '93, I/A: Ceramics, Powders, Corrosion and Advanced Processing*, edited by N. Mizutani et al., *Trans. Mat. Res. Soc. Jpn.*, vol. 14A (Elsevier 1994).

Racault et al., Solid–State Synthesis and Characterization of the Ternary Phase $Ti_3SiC_2$, *J. Materials Science* 29:3384–3392 (1994).

Arunajatesan et al., "Synthesis of Titanium Silicon Carbide", *J. Am. Ceram. Soc.* 78(3):667–672 (1995).

*Primary Examiner*—Michael Lewis
*Assistant Examiner*—Stuart L. Hendrickson
*Attorney, Agent, or Firm*—Panitch Schwarze Jacobs & Nadel, P.C.

[57] ABSTRACT

Products having single phases or solid solutions of the formula $M_3X_1Z_2$ wherein M is a transition metal, X is Si, Al or Ge and Z is B, C or N can be prepared by taking a powdered mixture containing M, X and Z to a temperature of about 1000° C. to about 1800° C., optionally simultaneously under a pressure of about 5 MPa to about 200 MPa. The products so formed have excellent shock resistance, oxidation resistance and machinability. The products may also be present as composites, preferably composites which are in thermal equilibrium with the single phase or solid solutions of the formula $M_3X_1Z_2$.

19 Claims, No Drawings

SYNTHESIS OF 312 PHASES AND COMPOSITES THEREOF

CROSS-REFERENCE TO RELATED APPLICATION

This application is based upon Provisional Application No. 60/006,720, filed Nov. 14, 1995.

FIELD OF THE INVENTION

The present invention relates to the production of ceramics, and in particular to ceramics of the formula $M_3X_1Z_2$ wherein M is a transition metal, X is Si, Al, Ge or Ga and Z is B, C or N.

BACKGROUND OF THE INVENTION

In general, metals are easily machined but do not retain their machined form at high temperatures. Ceramics retain their shape at extremely high temperatures, but are brittle and very difficult to machine into a desired shape. Materials scientists have directed a great deal of effort into finding compositions that are easily machined into a desired shape and are stable at extremely high temperatures.

Jeitschko and Nowotny reported the preparation of $Ti_3SiC_2$ in 1967. See *Montash für Chem.* 98:329–337 (1967). According to their brief description, powdered titanium hydride, silicon and graphite were combined in a self-contained graphite capsule at 2000° C. for about 20 minutes, and then the product was quickly cooled down to 1200° C. The product was extracted to obtain a sample of $Ti_3SiC_2$, which was characterized in terms of its crystal structure. The structure was found to be hexagonal and comprised planar Si-layers linked together by TiC octahedra. This characterization allows the theoretical density to be known, which is 4.31 g/cm$^3$.

A chemical vapor deposition (CVD) approach to $Ti_3SiC_2$ was reported by Nickl et al. in 1972, and by Goto et al. in 1987. See *J. Less-Common Metals* 26:335 (1972) and *Mat. Res. Bull.* 22:1195–1201 (1987). Each group of researchers used $SiCl_4$, $TiCl_4$, $CCl_4$ and $H_2$ as source gases. Goto et al. worked at a deposition temperature of 1573–1873° K with the total gas pressure in the CVD furnace fixed at 40 kPa. A monolithic plate of 40 mm by 12 mm by 0.4 mm was obtained with a deposition rate of 200 micrometers/hour.

Okano et al. reported using a mixture of titanium, titanium carbide and silicon powders to form $Ti_3SiC_2$. See Proceedings of the 3rd IUMRS International Conference on Advanced Materials, Tokyo, Japan 1993, as published in Advanced Materials '93, I/A: Ceramics, Powders, Corrosion and Advanced Processing, edited by N. Mizutani et al., *Trans. Mat. Res. Soc. Jpn.*, Vol. 14A (Elsevier 1994). The mixture of Okano et al. was compacted uniaxially and then calcined at 1300–1600° C. under a vacuum of $10^{-1}$ Pa for 1 hour. The so-formed $Ti_3SiC_2$ was pulverized, pre-formed in a graphite mold and then hot-pressed under a pressure of 45 MPa at 1400° C. for 30 min. This process resulted in vaporization, and consequent loss of silicon. Although the authors attempted to adjust the initial silicon loading to anticipate silicon vaporization, they were not able to prepare pure $Ti_3SiC_2$ phase.

In two papers, Pampuch et al. reported forming $Ti_3SiC_2$ by igniting a mixture of certain starting materials. See *J. European Ceramic Soc.* 5:283–287 (1989) and *J. Materials Synthesis and Processing* 1(2):93–100 (1993). Thus a stoichiometric mixture of titanium, silicon and carbon black was either cold-pressed and the resulting pellet placed in a graphite crucible and heated extremely rapidly from 800° C. to 1020–1080° C., or was placed as a loose powder in a graphite-lined boat and the boat contacted with a heating coil at 1830° C. Under either set of conditions the mixture ignited, causing a very rapid increase in temperature with concomitant formation of $Ti_3SiC_2$. The product as formed by either method was porous and contained titanium carbide (10–20%).

Pampuch et al. (1993) also reported that the products from their ignition processes can be ground to a powder, and the powder either pressureless sintered (cold-pressed at 200 MPa followed by sintering at 1450–1700° C. for 1 hour in an argon atmosphere) or hot-pressed (heated to 1250–1500° C. for 15 minutes at a pressure of 25 MPa). These pressure treatments provided $Ti_3SiC_2$ containing materials which were 95% of the theoretical density of $Ti_3SiC_2$.

After having made many unsuccessful attempts to prepare $Ti_3SiC_2$ in a single step, Racault et al. reported a multi-step synthetic procedure which provides $Ti_3SiC$ with less than 5 atomic % TiC. See *J. Materials Science* 29:3384–15 3392 (1994). The first step places titanium, silicon and graphite powders in an evacuated tube for 10 hrs. at 1100° C. Thereafter, the product is treated with aqueous hydrogen fluoride to remove $TiSi_2$ and leave a material consisting of 85% $Ti_3SiC_2$ and 15% TiC. The third step is a controlled oxidation at 450° C. in air for 10 hrs, which converts TiC to $TiO_2$. The fourth and final step dissolves the $TiO_2$ with a mixture of ammonium sulfate and sulfuric acid at about 100° C.

Arunajatesan and Carim have reported the preparation of $Ti_3SiC_2$ from a mixture of titanium, silicon and carbon powders. See *J. Am. Ceram. Soc.* 78(3):667–672 (1995). The powder mixture was compacted to pellets, optionally arc-melted in an argon atmosphere, and then heated in evacuated quartz tubes at either 900° C. for 24 hr (no $Ti_3SiC_2$ formed), 1400° C. for 5 hr ($Ti_3SiC_2$ with other phases formed but quartz tubes exploded) or 1200° C. for 100 hr ($Ti_3SiC_2$ formed in addition to other phases). The arc melting process caused some loss of silicon and carbon, but yielded samples having superior homogeneity. Treatment of the product with hydrofluoric acid, to leach out titanium suicides, was necessary to prepare final powders with over 99% phase-pure $Ti_3SiC_2$.

Arunajatesan and Carim also reported that heating a non-compacted mixture of titanium, silicon and carbon powders in an alumina boat under an argon atmosphere for up to 24 hours at 1270° C. to 1375° C. did not lead to any $Ti_3SiC_2$. Furthermore, silicon carbide and titanium carbide were examined as starting materials but did not lead to any $Ti_3SiC_2$.

The limited investigation that has been conducted on $M_3X_1Z_2$ phases indicates that they may have commercially valuable properties. There is thus a need in the art for a simple, one-step synthesis of $M_3X_1Z_2$ phases and composites thereof.

SUMMARY OF THE INVENTION

The invention provides a process for forming a product comprising an $M_3X_1Z_2$ phase wherein (i) M is at least one transition metal, (ii) X is at least one of Al, Ge, Ga and Si, and (iii) Z is at least one of B, C and N. The process comprises a first step of forming a mixture of (i) transition metal species, (ii) co-metal species selected from the group consisting of aluminum species, germanium species, gallium species and silicon species and (iii) non-metal species selected from the group consisting of boron species, carbon species and nitrogen species, said mixture being a powder comprising not more than about 80 weight percent $M_3X_1Z_2$. In a second step, reactive hot pressing at a temperature of about 1000° C. to about 1800° C. under a pressure of about 5 MPa to about 200 MPa is used to convert the mixture to a $M_3X_1Z_2$ phase. Another aspect of the invention is the product formed by this process.

In another aspect of the invention, a process is described for forming a product comprising $M_3Si_1Z_2$ phase. The process comprises the steps of forming a mixture of (i) transition metal species, (ii) silicon carbide, and (iii) non-metal species selected from the group consisting of boron species, carbon species and nitrogen species, said mixture being a powder comprising not more than about 80 weight percent $M_3Si_1Z_2$. The mixture is then heated to a temperature of about 1000° C. to about 1800° C. in a non-oxidizing atmosphere at substantially atmospheric pressure for a time sufficient to form $M_3Si_1Z_2$ phase. A further aspect of the invention is the product formed by this process.

DETAILED DESCRIPTION OF THE PREFERRED EMBODIMENTS

The present invention provides processes wherein a mixture of powders is exposed to high temperature and possibly pressure for a time sufficient to allow at least some of the powders to react with one another to form a 312 phase. As used herein, the term 312 phase encompasses ternary compounds and solid solutions, both of the formula $M_3X_1Z_2$, where M is one or more transition metals, X is one or more co-metals (which are not transition metals) such as Al, Ge, Ga and Si, and Z is one or more non-metals such as B, C and N. The designation "312" is taken from the molar ratio of M:X:Z in the phase. For convenience, the elements denoted by "M" will be referred to as transition metals, the elements denoted by "X" will be referred to as co-metals (although they could also be referred to as semi-metals or, more simply as "metals"), and the elements denoted as "Z" will be referred to as non-metals.

In general, a ternary compound consists essentially of three elements in a regular repeating array. The ternary compounds prepared by the inventive process are formed from a single transition metal (M), a single co-metal (X) and a single non-metal (Z). The stoichiometry of the ternary compounds prepared by the invention is such that the M:X:Z atomic ratio is substantially centered around 3:1:2. Preferred 312 phases prepared by the invention include $Ti_3SiC_2$ and $Ti_3GeC_2$.

In contrast to ternary compounds, the solid solutions prepared by the inventive processes are formed from at least four and possibly many more elements, where each of the elements is either a transition metal, a co-metal or a non-metal as defined herein. Thus, M in a solid solution may be one or more transition metals, while X may be one or more of silicon (Si), aluminum (Al) gallium (Ga) or germanium (Ge), and Z may be one or more of boron (B), carbon (C) and nitrogen (N). However, the molar ratio of the total of the transition metals (M) to the total of the co-metals (X) to the total of the non-metals (Z), i.e., M:X:Z in a solid solution prepared by an inventive process is substantially centered around 3:1:2.

Thus, the solid solutions prepared by the invention are essentially 312 phases wherein some of the transition metal is replaced with one or more different transition metals, and/or some of the co-metal is replaced with one or more different co-metals, and/or some of the non-metal is replaced with one or more different non-metals. Preferred solid solutions include $(Ti,Zr)_3SiC_2$, $(Ti,Hf)_3SiC_2$, $(Ti,Hf)_3(Si, Ge)C_2$, $(Ti,Zr)_3$ $(Si,Ge)$ $(C,N)_2$, $(Ti,V)_3SiC_2$, $(Ti,V)_3Si(C, N)_2$, $(Ti,V)_3(Si,Ge)$ $(C,N)_2$, $(Ti,V,Hf)_3$ $(Si,Ge)$ $(C,N)_2$, $(Ti, V,Hf)_3(Si,Ge,Al)$ $(C,N)_2$.

The 312 ternary compounds prepared by the invention and the solid solutions thereof prepared by the invention will be referred to collectively herein as 312 phases.

The 312 phases prepared by the invention are typically single phase and polycrystalline. In this instance, the term polycrystalline means that when viewed under a microscope, distinct grains can be seen wherein each distinct grain is formed of a single crystal of the ternary compound or solid solution. The grains can be distinguished from one another by their having unique crystal structure directionality. The term "single phase" is very well known in the art, and simply means that only one phase is present in the final microstructure.

The invention also provides for the preparation of composites of 312 phases, i.e., compositions wherein a 312 phase is in contact with at least one non-312-phase. A non-312-phase according to the invention is simply any phase which is not a 312-phase as defined herein. The non-312-phase is a solid at room temperature and atmospheric pressure. Preferably, although not necessarily, the non-312-phase will be in thermal equilibrium with the 312-phase. Reference to a phase diagram will allow one of ordinary skill in the art to readily determine non-312-phases that are in thermal equilibrium with a 312-phase. As prepared according to the invention, the composites will have the 312 phase preferably as the matrix.

The synthesis of 312 phases and composites thereof according to a preferred inventive processes requires the preparation of a mixture of powders that has the same atomic constitution as the desired 312 phase or composite thereof. According to this inventive process, all or essentially all of the atoms present in the mixture of powders will also be present in the product 312 phase or composite thereof, and essentially all of the atoms present in the product 312 phase or composite will also have been present in the mixture of powders. Thus, it is essential to prepare the mixture of powders such that it has the same atomic ratio as is desirably present in the product 312 phase or composite.

The mixture of powders employed in the inventive process comprises (i) transition metal species, (ii) co-metal species such as silicon species, aluminum species, gallium species and/or germanium species, and (iii) non-metal species such as boron species, carbon species and/or nitrogen species. The term "species" simply refers to a chemical that contains the indicated element, where chemicals include molecules, salts, compounds, complexes, polymers, etc.

A transition metal species is a chemical that includes at least one transition metal. Exemplary transition metals are those of Group 3 (Sc, Y, La and Ac), Group 4 (Ti, Zr and Hf), Group 5 (V, Nb, Ta) and Group 6 (Cr, Mo and W) of the Periodic Table of the Elements (current IUPAC designations). Other exemplary transition metals are first row transition metals, i.e., Mn, Fe, Co, Ni and Zn.

The transition metal species may be the transition metal per se, e.g., titanium metal of greater than 99% purity, or it may be a transition metal compound, complex, molecule, salt, etc., such as a transition metal hydride (e.g., titanium hydride), transition metal boride (e.g., titanium boride), transition metal carbide (e.g., titanium carbide), transition metal silicide (e.g., titanium silicide) or a transition metal nitride (e.g., titanium nitride).

Any transition metal species can be employed in preparing the mixture of powders according to the invention.

However, since substantially all of the atoms present in the starting mixture of powders are also present in the final product composition, the transition metal species preferably contains only the elements that are desirably present in the final product composition. Transition metal hydrides are an exception to this general rule, and in fact transition metal per se and transition metal hydride are preferred transition metal species according to the invention.

Some transition metals are difficult to prepare in powdered form, and it is known in the art to react transition metal per se with hydrogen, to form transition metal hydride that is substantially more brittle than transition metal per se. The transition metal hydride is then powdered and may be used in the inventive process, or may be converted back to transition metal per se by dehydriding before being used in the inventive process.

Titanium is a preferred transition metal for a transition metal species. In preparing products by the inventive process, titanium metal per se, including dehydrided titanium, as well as titanium hydride are preferred transition metal species. Thus, M is preferably Ti in the 312 phases and composites thereof prepared according to the invention. When 312 phase solid solutions are prepared according to the invention, M is preferably predominantly titanium, more preferably M is at least about 80% of the transition metal component of the 312 phase solid solution, and even more preferably is at least about 95% of the transition metal component of the 312 phase solid solution.

A co-metal species of the invention is any chemical, e.g., a compound, complex, molecule or salt, that contains a silicon, aluminum, gallium or germanium atom. Likewise, a silicon, aluminum, gallium and/or germanium species is any chemical that contains at least one silicon, aluminum, gallium or germanium atom, respectively. Thus, a co-metal species may be a co-metal per se (e.g., silicon metal), co-metal carbide (e.g., silicon carbide), co-metal nitride (e.g., silicon nitride) or a bimetallic transition metal/co-metal species (e.g., titanium silicide).

Preferred aluminum species are aluminum metal (aluminum metal per se), aluminum nitride and aluminum carbide.

Preferred germanium species are germanium metal (germanium metal per se) and germanium nitride.

Preferred gallium species are gallium metal (gallium metal per se) and gallium nitride.

Preferred silicon species are silicon metal (silicon metal per se), silicon carbide, silicon nitride and transition metal silicides such as titanium silicide.

Silicon carbide is a more preferred silicon species, where silicon carbide can also serve as a non-metal (carbon) species in the mixture, as discussed below.

A third component of the mixture of the invention is a non-metal species, which is any complex, compound, molecule, salt, etc., that contains at least one non-metal atom such as carbon, boron and nitrogen. Preferred non-metal species contain boron (denoted herein as boron species), carbon (denoted herein as carbon species) and/or nitrogen (denoted herein as nitrogen species).

Carbon species are a preferred non-metal species, where preferred carbon species contain substantially exclusively carbon atoms, such as graphite, carbon black, charcoal and coke. However, carbon species containing atoms in addition to carbon, such as transition metal carbides (e.g., titanium carbide) and non-transition metal (i.e., co-metal) carbides (e.g., silicon carbide) may also be employed as the carbon species.

Boron species that are suitable non-metal species for the invention include boron, silicon boron, and transition metal boride.

Nitrogen species that are suitable non-metal species for the invention include silicon nitride and transition metal nitride (e.g., titanium nitride).

As seen from the above illustrations, a specific transition metal, co-metal or non-metal species may be elemental, i.e., formed of only the transition metal, co-metal or non-metal respectively. In addition, a specific transition metal, co-metal or non-metal species may be binary, i.e., formed from two elements, e.g., SiC, although not necessarily in equimolar amounts, e.g., as in $Al_4C_3$. Although not typically the case, the specific transition metal, co-metal or non-metal species may be ternary, quaternary, or even a higher order form.

The inventive process is distinct from hot pressing merely to density a mixture of powders, in that a reaction occurs between the components of the mixture so as to form 312 phases. Thus, the mixture of powders preferably does not contain any of the 312 phase which is to be formed by the inventive process. However, the presence of 312 phase in the mixture of powders is not detrimental to the inventive process, and so the mixture of powders may contain 312 phases. However, the initial mixture of powders preferably contains no more than about 80 weight percent of the 312 phase being formed by the process, and more preferably contains no more than about 50 weight percent of the 312 phase being formed by the process.

The mixture of powders used as the starting material in the inventive process is formed from transition metal species, co-metal species and non-metal species. Thus, each of the transition metal species, co-metal species and non-metal species is preferably in powdered form prior to being mixed together to form the mixture of powders. A certain powder in the mixture of powders can serve in more than one capacity, i.e., it can function as more than one of a transition metal species, co-metal species or non-metal species. For example, silicon carbide may be present in the mixture of powders, and serve as both a co-metal species and non-metal species.

The individual powders used to prepare the mixture of powders typically have average particle diameters ($d_m$) of about 0.1 to about 200 microns. Preferably, the transition metal species has a particle size of about 1 to about 100 $\mu$m, the co-metal species has a particle size of about 0.1 to about 80 $\mu$m, and the non-metal species has a particle size of about 0.1 to about 100 $\mu$m. Another way to characterize the size of the powders is to specify the mesh size through which they will pass. By this convention, the powders used in the invention preferably have a mesh size of less than about 100, and more preferably have a mesh size of less than about 325. The designation −325 mesh indicates that the powder will pass through a 325 mesh screen.

To prepare 312 phases by the inventive process, a mixture of powders containing transition metal species, co-metal species and non-metal species is prepared such that the molar ratio of M:X:Z in the mixture of powders is substantially centered around 3:1:2. The exact amount by which the M:X:Z molar ratio may vary from 3:1:2 and yet still form exclusively 312 phase depends on the identity of the 312 phase being prepared. Thus, reference to a phase diagram including the 312 phase of interest will reveal the stoichiometric boundaries of the 312 phase, and thus the stoichiometric boundaries within which the mixture of powders must stay if exclusively 312 phase is to be formed. As a rough estimate, the molar ratio of M:X:Z should be within about 20% of the 3:1:2 ratio, i.e., about 3.6–2.4:1.2–0.8:1.4–0.6 for 312 phase to form exclusively. Preferably, the mixture has a M:X:Z molar ratio of about 0.4–0.9:0.1–0.6:0.1–0.6, more preferably has a M:X:Z molar ratio of about 0.45–0.55:0.15–0.18:0.3–0.35 and still more preferably has a M:X:Z molar ratio of about 0.5:0.17:0.33.

If a composite of a 312 phase is to be prepared by the inventive process, then the molar ratio of M:X:Z in the mixture of powders can vary over a wider range than is the case when exclusively 312 phase is to be prepared. In those instances where the non-312-phases are in thermal equilibrium with the 312-phase, then reference to a phase diagram will allow one of ordinary skill in the art to determine the molar ratio of M, X and Z that may be present in the mixture of powders. In those instances where the non-312-phase is not in thermal equilibrium with the 312 phase, then the mixture of powders should contain M:X:Z in a ratio substantially centered around 3:1:2, along with powders which will form the non-312-phase.

To prepare the mixture of powders, all of the individual powders of transition metal species, co-metal species and non-metal species are combined and then mixed thoroughly to provide a homogeneous mixture. Machines that can mix powders to homogeneity are well known in the art, and are suitably employed in the present invention. One such machine is known as a V-blender. A mixing time of about 2 hours in a V-blender will typically provide a homogeneous mixture of powders suitable for use in the inventive process.

As a preferred but optional step, the mixture of powders is compacted to form what is known in the art as a "compact" or a "green body". Methods for forming compacts and green bodies from powders are well known in the art, and any such method may be employed in the inventive process. Green bodies for use in the inventive process may be formed by cold-pressing, i.e., no heat is applied while the mixture of powders is placed under pressure. A binder may optionally be present in the mixture of powders when forming a green body, where the binder provides some cohesiveness to the powders that make up the green body. Appropriate binders are well known in the art.

A preferred process for forming the green body places the mixture of powders into a die, and then exerts a pressure of about 5 MPa to about 300 MPa, preferably about 180 MPa onto the mixture. A time of only a few minutes is typically sufficient to form the green body. For convenience, the following description will refer to the green body, however the (uncompacted) mixture of powders can just as easily be used in the following process.

According to the invention, the green body is exposed to high temperature, and optionally is simultaneously exposed to pressure. Under these conditions the components of the green body react with one another to form a 312 phase and, optionally, composites thereof. The term "hot pressing" is well-known in the ceramics art as referring to a number of specific processes wherein materials are heated under pressure. In the prior art hot pressing processes, a reaction may or may not occur between the components of the material being hot pressed. However, hot pressing according to the present invention necessarily provides for a reaction to occur between the components in the green body or mixture of powders, and thus a preferred embodiment of the inventive process will be referred to herein as reactive hot pressing. However, any hot pressing process as known in the art may be used to achieve reactive hot pressing according to the present invention.

The Concise Encyclopedia of Advanced Ceramic Materials, R. J. Brook, ed., Pergammon Press, Oxford, 1991 provides a description of hot pressing processes. Two hot pressing processes preferred according to the present invention are known as vacuum hot pressing and hot isostatic pressing (HIP). While both of these techniques are widely used in the art and thus need not be described in detail, each will be briefly summarized.

In vacuum hot pressing, a sample is placed in a press, where the sample holder can be evacuated and heated. The sample is then steadily heated and the press is activated so that a steadily increasing load is applied to the sample. Samples can be exposed simultaneously to temperatures in excess of about 2000° C. and pressures in excess of about 100 MPa by the vacuum hot pressing process. After the desired amount of time, the chamber is cooled and the pressure on the sample is released.

In HIP, a sample is placed in a chamber, where the chamber can be quite large. The sample is encapsulated either before insertion into the chamber or becomes encapsulated during the HIP process. A convenient means to encapsulate the sample during the HIP process is to place the sample into a glass tube (e.g., pyrex), place the glass tube into the HIP chamber, evacuate the chamber and heat the chamber to the softening point of the encapsulating glass (usually around 800–900° C., however this temperature can vary over a wide range). After the encapsulated sample is in the chamber, an inert gas is pumped into the chamber to a pressure of about 40 MPa (again, this pressure can vary over a wide range). Thereafter, the chamber is heated to a higher temperature resulting in a concomitant increase in pressure inside the chamber. After the desired amount of time, the chamber is cooled and the excess pressure is released.

Regardless of the details of the hot pressing process, a preferred embodiment of the invention provides that a green body is exposed to a temperature of about 1000° C. to about 1800° C., preferably about 1200° C. to about 1700° C., and more preferably about 1300° C. to about 1600° C. Simultaneously, the green body is exposed to a pressure of about 5 MPa to about 60 MPa, preferably about 15 MPa to about 45 MPA. According to a preferred process, the green body is exposed to a temperature of about 1300° C. to about 1600° C. while being under a pressure of about 15 MPa to 45 MPa. Under these conditions, the powders preferably remain as solids, i.e., do not liquify or volatilize. Thus, at all times during the hot pressing process, the materials being heated and pressed preferably remain in the solid state.

The green body is held under these conditions to form a 312 phase or composite thereof as described above.

Preferably, the green body is held under these conditions until the reaction to form the 312 phase or composite thereof has gone to completion, i.e., until thermal equilibrium has been reached. A reaction time of about 5 hours is usually sufficient, and even shorter reaction times, for example about 1 hour or even about 10 minutes may be suitable. As is known in the art, shorter reaction times may be employed at higher reaction temperature.

The 312 phases or composites thereof of the invention ("the products") preferably contain few if any voids, also called pores, between the grain boundaries of a product. Thus, a preferred product has less than 1 volume percent contributed by pores. Consequently, the preferred product will have a density equal to, or nearly equal to the theoretical density for the 312 phase or composite thereof.

In another embodiment of the inventive process, the mixture of powders may be heated without applied pressure.

Such heating is preferably accomplished in a controlled manner, i.e., such that the powders do not ignite. Another preferred pressureless reaction process is self-propagating high-temperature synthesis (SHS), as described in, e.g., H. Pampuch et al., *J. Materials Synthesis and Processing* 1(2):93–100 (1993). In either process, some of the powder constituents may melt during the reaction that forms the 312 phase or composite thereof.

When the mixture of powders is heated without pressure, the final product will more likely than not be porous. For some applications, such a porous product can be used as is. For other applications, such a product may be ground or milled to form powder, and this powder can then be pressureless sintered or hot-pressed to form a final product.

In yet another embodiment of the invention, a preform may be formed of (a) the co-metal and the non-metal or (b) the transition metal and non-metal, either as elemental powders or as compounds. The preform is prepared according to techniques known in the art, such as by simply pressing the powders, optionally with a binder. Then transition metal (in case (a)) or the co-metal (in case (b)) is melted separately and poured or otherwise placed into contact with the preform to initiate the reaction and form the final body of 312 phase or composite thereof.

According to the reactive hot pressing process described above, a product comprising essentially single phase $Ti_3SiC_2$ can be formed having less than 1 volume percent pores. Such a product has a density of about 4.45 g/cm$^3$ to about 4.49 g/cm$^3$, a parabolic oxidation rate constant of about $0.1 \times 10^{-8}$ to about $10 \times 10^{-8}$ kg$^2$m$^{-4}$s$^{-1}$ and is thermally stable for a time of at least about 5 hours at a temperature of about 1400° C. The $Ti_3SiC_2$ exhibits essentially no thermal shock as demonstrated by showing no change in bend strength after being heated to a temperature of 1400° C. and then immediately quenched in a water bath at 25° C. The $Ti_3SiC_2$ has a microhardness of about 2 to about 5 GPa and a compressive strength measured at 1300° C. of at least about 260 MPa. The deformation was ductile and showed considerable (at least about 50%) plasticity at 1300° C. The $Ti_3SiC_2$ prepared by the inventive process has a modulus of elasticity of at least about 320 GPa.

Furthermore, the $Ti_3SiC_2$ prepared by the invention is easily machined. That is, the $Ti_3SiC_2$ product is easily machinable without lubrication using regular high speed tool steel, and the holes so-formed can easily be hand-tapped to form very well-defined threads.

The following examples are set forth as a means of illustrating the present invention and are not to be construed as a limitation thereon. In the Examples that follow, the graphite was 97.5% pure, −325 mesh, $d_m$=1–2 $\mu$m, from Aldrich Chemical, Milwaukee, Wis. Unless otherwise noted, all other powders were obtained from Johnson Matthey Co., Wood Hill, Mass.

EXAMPLE 1

A mixture was prepared from the following powders: 100 g of hydrided Ti (99.99% pure, −325 mesh), 27.8 g of SiC (hexagonal, average particle size 100 $\mu$m, 97.5% pure, $d_m$=99 $\mu$m, Carborundum, Niagara Falls, N.Y.) and 8.33 g of graphite. The powders were dry-mixed in a V-blender for two hours, and then 50 gm of the mixture was cold pressed under 180 MPa in a 3×0.5 inch rectangular die to form a green body. The thickness of the green body was ≈15 mm.

The green body was wrapped in graphite foil, sprayed with boron nitride (which acts as a mold release) and then placed in a 3×0.5 split graphite die which was also sprayed with boron nitride on the inside. The die was then placed in a vacuum hot press, and subjected to the following temperature and pressure cycles (both cycles were started simultaneously): Temperature: heating rate was 600° C./hr to a temperature of 1600° C., held at 1600° C. for 4 hours, then cooling at the same rate as it was heated. Pressure: loading rate was 41 kN/hr to a pressure of 42 MPa, held at 42 MPa for 5 hr and 40 min, then unloaded at the same loading rate as it was loaded.

After cooling, the resulting product was found to be fully dense, single phase $Ti_3SiC_2$ with less than 5% TiC and SiC. The composition was fully dense, i.e., had a density in excess of 99% of the theoretical density for $Ti_3SiC_2$. The $Ti_3SiC_2$ product was easily machinable without lubrication using regular high speed tool steel, and was easily hand-tapped to form very well-defined threads.

Small cubes were machined and the compressive strength measured at room temperature and at 1300° C. in air using a strain rate of $10^{-4}$s$^{-1}$. At room temperature, the compressive strength was measured to be 580±20 MPa. Since no attempt was made to reduce the friction between the samples and the compressive platens, these values have to be considered a lower bound. At 1300° C., the compressive strength was 260±5 MPa. The load displacement curves, however, indicate substantial (>20%) yield at 1300° C.

EXAMPLE 2

A mixture was prepared from the following powders: 100 g of dehydrided Ti (as in Example 1), 27.8 g of SiC (particle size between 44 $\mu$m and 75 $\mu$m, otherwise same as Example 1) and 8.33 g of graphite.

The powders were dry-mixed and cold pressed as in Example 1. The resulting green body was placed in a vacuum hot press as in Example 1, and the resulting composition had a single phase of $Ti_3SiC_2$ with less than 2% TiC and SiC, and was fully dense. The $Ti_3SiC_2$ product was easily machinable without lubrication using regular high speed tool steel, and was easily hand-tapped to form very well-defined threads.

The difference between examples 1 and 2 is in the Ti (hydride vs. dehydrided) and average size of SiC.

EXAMPLE 3

A mixture was prepared as in Example 1, with the exception that the titanium hydride powder was 99% pure instead of 99.99% pure. A green body was prepared and hot pressed as in Example 1, to provide a composition containing single phase $Ti_3SiC_2$ with less than 2% TiC and SiC, which was fully dense. The $Ti_3SiC_2$ product was easily machinable without lubrication using regular high speed tool steel, and was easily hand-tapped to form very well-defined threads.

EXAMPLE 4

A green body as formed in Example 3 was placed in a vacuum furnace and subjected to the following temperature cycle (under vacuum but with no pressing of the vacuum furnace): heat to 1600° C. at a heating rate of 600° C./min, hold at 1600° C. for 4 hours and then cool at the same rate as the heating rate. After cooling, the resulting composition had a density of 2.7 g/cm$^3$ (60k of theoretical density for $Ti_3SiC_2$) and x-ray diffraction showed it to be single phase $Ti_3SiC_2$.

EXAMPLE 5

A mixture was prepared from the following powders: 47.9 g titanium (as in Example 1), 14 g SiC (as in Example 1) and 9.6 g graphite.

The mixture of powders was formed into a green body as described in Example 1, and then hot pressed as described in Example 1. The resulting product was found to be fully dense and multiphases consisting of 20% $Ti_3SiC_2$, 40% TiC and 40% SiC.

EXAMPLE 6

A mixture was prepared from the following powders: 47.9 g of titanium (99.5% pure, −325 mesh), 4 g of graphite and 13.3 g SiC (as in Example 1). The powders were dry-mixed in a V-blender for two hours, and then the mixture was cold pressed under 180 MPa in a 3×0.5 inch rectangular die to form a green body. The thickness of the green body was 15 mm.

The green body was reacted using a hot isostatic pressing (HIP) process. According to this process, the green body was sealed in a pyrex glass tube under vacuum. The sealed glass tube was placed in the chamber of a hot isostatic press, the chamber was evacuated and subjected to the following temperature and pressure cycles. Starting from room temperature, a heating rate of 30° C./min was used to attain a temperature of 850° C. (the glass softening temperature) within the evacuated chamber, and the mixture held at that temperature for 1 hour. The system was then pressurized to 40 MPa and the heating continued at a rate of 10° C./min up to 1600° C. which caused an increase in the pressure to 60 MPa. The sample was maintained under these conditions for four hours and then cooled.

After cooling, the sample was soaked in hydrofluoric acid for 5 hours to dissolve the encasing pyrex glass. The resulting product was found to be fully dense, single phase $Ti_3SiC_2$ (less than 0.5 vol. % SiC and TiC). The $Ti_3SiC_2$ product was easily machinable without lubrication using regular high speed tool steel, and was easily hand-tapped to form very well-defined threads. Scanning electron microscopy of the fractured surfaces unambiguously demonstrated the layered structure of the product.

EXAMPLE 7

The following mixture of powders was prepared: 14.37 g titanium (hydrided, as in Example 1), 7.26 g germanium (99.999% pure, −100 mesh) and 2.40 g graphite ($d_m$=1 µm). The powders were cold-pressed into a green body of ≈10 mm thickness using a 2.75×0.5 inch rectangular die and 180 MPa pressure.

The green body was wrapped in a graphite sheet sprayed with boron nitride and then placed in a 3×0.5 inch split graphite die which was also sprayed with boron nitride. The die was placed in a vacuum hot press and subjected to the following temperature and pressure cycles (both cycles were started simultaneously). The temperature cycle consisted of three segments: a ramp at 300° C./hr. from room temperature to 900° C., soak at 900° C. for 1 hour, a second ramp at 300° C./hr to 1200° C., soak at 1200° C. for 4 hr, then a third ramp at 300° C./hr to 1500° C. followed by a soak at 1500° C. for 4 hr. The sample was then allowed to cool slowly to room temperature in the hot press under vacuum. The pressure cycle consisted of a ramp at 22 kN/hr, hold at 45 kN (corresponding to 45 MPa pressure) for 12 hours, then unloading at 22 kN/hr.

The resulting product was found to be fully dense, practically single phase $Ti_3GeC_2$ with a minor amount of TiC.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for forming a substantially single phase product comprising an $M_3X_1Z_2$ phase wherein (i) M is at least one transition metal, (ii) X is Si, and (iii) Z is C, said process comprising the steps:

(a) forming a mixture of (i) transition metal species, (ii) silicon species selected from the group consisting of elemental silicon, silicon carbide, and transition metal silicide and (iii) carbon species, said mixture being a powder comprising not more than about 80 weight percent $M_3X_1Z_2$;

(b) reactive hot pressing said mixture at a temperature of about 1000° C. to about 1800° C. under a pressure of about 5 MPa to about 200 MPa for a time sufficient to form $M_3X_1Z_2$ phase.

2. The process of claim 1 wherein said temperature is about 1300° C. to about 1600° C. and said pressure is about 35 MPa to about 45 MPa.

3. The process of claim 1 wherein said mixture is a solid under ambient conditions and remains a solid during step b.

4. The process of claim 1 wherein said mixture has a M:X:Z molar ratio of about 0.4–0.9:0.1–0.6:0.1–0.6.

5. The process of claim 1 wherein said mixture has a M:X:Z molar ratio of about 0.45–0.55:0.15–0.18:0.3–0.35.

6. The process of claim 1 wherein said mixture has a M:X:Z molar ratio of about 0.5:0.17:0.33.

7. The process of claim 1 wherein said transition metal species is selected from the group consisting of chemicals that contain at least one element from Groups 3, 4, 5 or 6 of the Periodic Table of the Elements.

8. The process of claim 1 wherein said transition metal species is selected from the group consisting of chemicals that contain at least one element from the first row transition metals of the Periodic Table of the Elements.

9. The process of claim 1 wherein said transition metal species is selected from the group consisting of transition metal, transition metal hydride, transition metal carbide, and transition metal silicide.

10. The process of claim 1 wherein M is titanium.

11. The process of claim 1 wherein said transition metal species is titanium hydride or titanium metal.

12. The process of claim 1 wherein said silicon species is silicon carbide.

13. The process of claim 1 wherein said carbon species is selected from the group consisting of graphite, carbon black, charcoal, coke, non-transition metal carbide and transition metal carbide.

14. The process of claim 1 wherein said transition metal species is titanium metal or titanium hydride, and said silicon species is silicon carbide.

15. The process of claim 14 wherein said titanium metal, titanium hydride, silicon carbide and carbon species are each at least about 95 weight percent pure.

16. The process of claim 1 wherein said transition metal species has a particle size of about 1 to about 100 µm, said silicon species has a particle size of about 0.1 to about 80 µm, and said carbon species has a particle size of about 0.1 to about 100 µm.

17. A process for forming a substantially single phase product comprising $M_3Si_1Z_2$ phase wherein M is at least one transition metal and Z is at least one of B, C and N, said process comprising the steps:

(a) forming a mixture of (i) transition metal species, (ii) silicon carbide, and (iii) non-metal species selected from the group consisting of boron species, carbon species and nitrogen species, said mixture being a powder comprising not more than about 80 weight percent $M_3Si_1Z_2$;

(b) heating said mixture to a temperature of about 1000° C. to about 1800° C. at substantially atmospheric pressure for a time sufficient to form $M_3Si_1Z_2$.

18. The process of claim 17 wherein the transition metal species is selected from the group consisting of titanium metal and titanium hydride, and said non-metal species is essentially pure carbon.

19. A process for forming a substantially single phase product comprising an $M_3X_1Z_2$ phase wherein (i) M is at least one transition metal, (ii) X is Si, and (iii) Z is C, said process comprising the steps:

(a) forming a mixture of (i) transition metal species, (ii) silicon species and (iii) carbon species selected from the group consisting of graphite, carbon black, charcoal, coke, non-transition metal carbide and transition metal carbide; said mixture being a powder comprising not more than about 80 weight percent $M_3X_1Z_2$;

(b) reactive hot pressing said mixture at a temperature of about 1000° C. to about 1800° C. under apressure of about 5 MPa to about 200 MPa for atime sufficient to form $M_3X_1Z_2$ phase.

* * * * *